United States Patent [19]

Billington et al.

[11] 4,064,907
[45] Dec. 27, 1977

[54] FILL LIMITING FILLER VALVE UNIT

[75] Inventors: Evans R. Billington, Glenview; Robert J. Batka, Chicago, both of Ill.

[73] Assignee: Rego, Chicago, Ill.

[21] Appl. No.: 728,038

[22] Filed: Sept. 30, 1976

[51] Int. Cl.² ............... F16K 35/00; F16K 33/00
[52] U.S. Cl. ................... 137/614.2; 137/446; 141/18; 141/198
[58] Field of Search ............ 141/198, 18, 95; 251/298; 137/446, 448, 614.2

[56] References Cited

U.S. PATENT DOCUMENTS 3,929,155   12/1975   Garretson ............... 141/198

Primary Examiner—Houston S. Bell, Jr.
Attorney, Agent, or Firm—Watson D. Harbaugh

[57] ABSTRACT

A high volume filler and automatic fill-limiting valve unit for customer LP Gas dispensing systems in which tandem backflow check valves are opened by incoming replenishing liquid. When a prescribed outage fill level is reached, the inner one of the valves is released from a mechanical restraint of a float control to convert and operate as an inflow check valve which is closed by the incoming flow pressure drop across it to arrest further inflow and permit the outer one of the valves to also close if it is mechanically free to do so. In either case after inflow shutoff the inner valve under spring pressure resumes its normal outflow check valve position to free the float mechanism and independently supplement the backflow check valve function of the outer valve.

9 Claims, 5 Drawing Figures

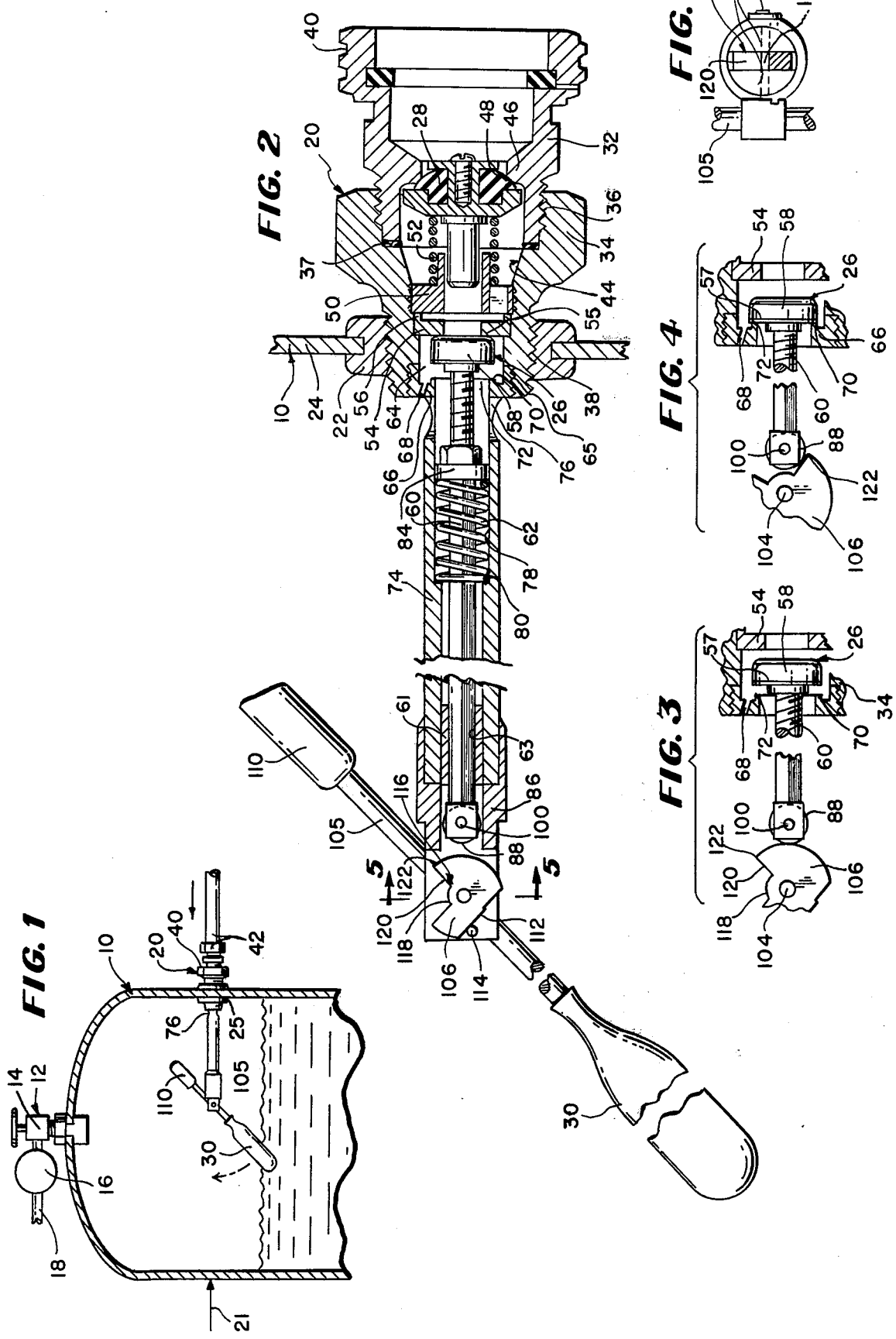

FILL LIMITING FILLER VALVE UNIT

BACKGROUND OF THE INVENTION

In using LP Gas fuel in vehicles and for recreational purposes including cooking, heating and lighting, the consumer's supply tank whether disposed horizontally or vertically should not be filled in excess of 80% of its volume for safety reasons and, this fill limit should be controlled automatically with great accuracy not only to prevent dangers of an overfilled tank but to fill the tank to its permitted capacity for its maximum utilization.

Moreover, the liquid fill level control may be mounted through the side of the tank and be responsive to the 20% outage liquid level at the horizontal center of either a horizontally or vertically disposed storage tank to avoid variation of the fill limit level of the liquid in tanks, should their normal orientation be tilted either in use or intentionally for furtive overfilling.

SUMMARY OF THE PRESENT INVENTION

In the present invention, with a very slight increment of movement at a predetermined fill level in either a horizontal or vertical tank, a float is operated by the liquid reaching the 80% outage fill level to trigger the closure of an inner double acting inflow cutoff valve of a filler valve unit that also embodies an outer backflow check valve disposed at the entrance of a fill passage where it may be held open either mechanically when the filler hose nozzle is attached, or hydraulically when pressure inflow of replenishing liquid engages it.

The inner valve preferably is a three-position valve disposed tandem to the outer valve and moves between two opposing sets to also provide an intermediate position for selective operations. The outer seat cooperates in one position of the valve as a normally closed outflow check valve. The inner seat cooperates as a normally open inflow cutoff valve when freed of float restraint to close under inflow pressure. A liquid level actuated float arrangement, preferably counterbalanced for sensitive operation, supports the valve in its intermediate position for full inflow of replenishing fuel through both valve seats and includes a sharp corner and roller coaction elements for a low friction critical fill level cutoff response. The sharp corner cutoff is easily set for cutoff in horizontal tanks as well as vertical tanks, provided horizontal tanks are supported horizontally level during filling. Location of the cam described need only be rotationally changed 90° for the valve unit to be mounted on the head of a vertical tank when the pivotal axis of the cam is disposed at the 80% outage level.

The valve unit embodying the invention is simple in construction and assembly and easily installed in the side wall of the tank. In horizontal tanks it preferably is at the circumferenced horizontal tangent of the 80% volume level and preferably at the longitudinal midpoint of the tank if the tank can rock endwise or is not level. In vertical tanks installation is at the 20% outage level. Preferably with both the float is at the horizontal center of the tank.

The valve assembly illustrated in the drawing as installed in any vessel at the desired filling level automatically stops the entry of replenishing LP Gas above the selected level. This, as now established in the industry, is at an 80% fill level referred to. Preferably, the valve is level and located in the tank wall at this height so that its correct positioning and operation are assured.

IN THE DRAWINGS

FIG. 1 is an illustration of an installation of a preferred embodiment of the invention in the side wall portion of a portable tank when connected to a filler hose;

FIG. 2 is an enlarged vertical sectional view of the filler valve means embodying the invention taken on its center line as mounted on an LP Gas tank;

FIG. 3 is a sectional view taken on the axis of the valve means with both valve seats of the multi-purpose valve open during a filling operation with the inflow valve supported by the cam preliminary to a critical release for movement to its closed position;

FIG. 4 is an enlarged view of the float release control for permitting the closing of the valve under pressure inflow of the inflowing liquefied gas; and FIG. 5 is a section taken on line 5—5 of FIG. 2.

DESCRIPTION OF PREFERRED EMBODIMENT

Referring to the drawing in further detail, the LP Gas dispensing system involved with the present invention comprises a portable tank 10, such as generally used with a vapor eduction unit 12 secured in the top thereof which includes a vapor eduction shutoff valve 14 and regulator 16 in the service 18. The tank 10 illustrated is portable for handling and use in a vertical orientation. It could be a horizontally disposed truck fuel tank. A filler valve unit 20 embodying the invention is disposed in a horizontal position at the 80% liquid level 21 as threadedly assembled into a coupling 22 welded in the side wall 24 of the container at said level with suitable marking on the element thereof which indicates the correct orientation of the float therein which is vertical for both vertical and horizontal tanks.

The internal construction of the valve unit 20 embodiment illustrated comprises a unitized fitting which is separately installed on the tank but its construction would be substantially the same whether it is part of a multiple fitting or a single fitting as illustrated.

The assembled valve unit 20 has two normally closed outflow check valves disposed in tandem which open under incoming liquid pressure. The inner valve 26 additionally closes in opposite directions and under certain conditions, to be described, is supported in an intermediate open position by the cam 106 and when released by the float serves as a closed inflow check valve until pressure upon incoming liquid is terminated whereupon both valves recover and secure as outflow check valves. The inner valve 26 prevents excessive escape of fluid if the outer valve 28 is tampered with or remains open.

More particularly, the two valves are supported in separate housings 32 and 34 that are threaded together with expected permanence at 36. The outer housing 32 is threaded into the inner housing 34 with a straight thread and a seal 37 for servicing the outer valve, if need be. The inner housing 34 is threaded into the coupling 22 with a tapered self-sealing pipe thread 38 for permanent tightening. The outer housing 34 is provided with an Acme thread 40 to which the filler hose coupling assembly 42 is threaded during filling operations. If desired, the coupling 42 may be equipped with an actuator rod (not shown) to physically open the outer valve 28 when the filler hose is attached.

Both valves are axially bored to provide a flow passage 44 for the fluid through the valve ports. The outer housing 32 has an internal flange 46 with the inner face serving as a valve port seat 48 and receives thereagainst the outer valve member 28 which cooperates with the valve seat as supported by a guide 50 threaded into the mouth of the inner housing 34 to support a compression spring 52 thereagainst which operates to close the outer valve 28 when the unit is assembled.

The guide 50 also holds a retainer or spacer 54 whose outer face provides a land 56 against which it rests. The inner valve head 58 closes against the inner face 55 of spacer 54 as supported on a valve stem 60 carrying a spring 62 that urges the inner valve outwardly thereagainst.

The inner end of the inner housing 34 has a valve chamber 64 defined by a wall 66 having a bleed passage 68 therethrough and a flow passage bore surrounded by a valve seat land 70 coacting with a valve seat disc 57 on the valve head 58 as an inflow check valve, the valve stem 60 assembly being received through the inner valve port 72.

The inner valve stem 60 is partially hexagonal at 61 and is received in a hexagonal broach 63 of the tubular member 74. Their structure and arrangement is simple to provide for production length variations that accommodate a wide range of tank dimensions and orientations. The tubular member 74 is secured to the inner housing 34 by threading at 65 for ease of manufacture and assembly and has at its outer end the inflow ports 76 discharging into the tank. This provides an internal guiding wall 78 terminating in a shoulder 80 engaged by a valve compression spring 62 whose outer end in turn engages a stop and nut assembly 84 threaded on the stem proximate the ports 76 whereby the spring 62 urges the valve member 26 outwardly to close against the valve port 57.

The inner end of the tubular member 74 carries a tubular mounting block 86 and the inner end of the stem 60 carries a roller 88 journaled on a shaft 100 which is mounted in sliding relation guided by the hexagonal engagement at 63 to maintain the roller 88 in a predetermined plane. The end of the tubular block 86 is bifurcated to provide two side elements 102 parallel to said plane to journal a cross-shaft 104 which rigidly carries and journals a cam 106 in said plane. The shaft 104 extends beyond the side elements 102 to receive the support rod 105 of the float 30 having a weight 110 on the other end that partially counterbalances the float.

The cam 106 is so constructed and arranged as to have a recess 112 with one wall engaging a supporting pin 114 when the float lowers to a 45° angle. Another cam recess 116 has a radial relief 118 defining a wall 120 disposed approximately parallel with said float and defining with the periphery of the cam a sharp dropoff or corner 122 at the point of engagement by the roller 88 just prior to the 80% fill level being reached by the float 30. Thereby, the pressure of incoming fluid flowing against and around the inner valve 26 presses the roller against the cam 106 and the moment that the corner passes a line intersecting the axes of the cam 106 and roller 88 the force of incoming liquid upon the inner valve 26 overcomes the comparatively light spring 62 and the float assembly rotatively yields to permit the inner valve 26 to close to stop inflow, thereby equalizing pressures on opposite sides of the outer valve 28 to permit it to close. Thereafter the filling is stopped either manually or automatically with the stoppage of inflow, and the filler hose coupling 42 is disconnected. The bleed passage 68 equalizes pressures to permit the inner valve to move outwardly to serve again as an outflow check valve. This clears contact of the roller 88 with the cam 106 to free the float and permit it to again follow the level of liquid freely in the tank until the next time the tank is filled, whereupon the roller 88 is again advanced into contact with the cam 106.

It will be noted that the compression spring 62 of the inner valve 26 minimizes pressure on the roller 88 for optimum sensitivity, the pressure upon the inner valve 26 of incoming liquid being opposed at a safe sensitive level by the tension of the spring. The strength of this tension is critical only to off-center the roller 88 slightly to start it down the inclined wall 20 of the cam 106. Thereafter, further compression occurring in the spring is of lessening significance since the wedging-leverage effect once started by the roller upon the cam incline requires less effort for the accomplishment of the closure of the inner valve port 72.

What is claimed is:

1. A fill limiting filler valve assembly for a liquefied petroleum gas service tank comprising:

a filler valve housing extendable through the wall of a storage tank and pivotally supporting a cam means at the liquid fill limit of the tank and including a normally closed filler backflow check valve for connection to a pressure filler hose in sealed relation and having a valve member coacting with an inlet port to open under inflowing liquid filling pressure;

fill control means having spaced inner and outer open valve ports with a valve chamber between them through which the replenishing liquid flows;

valve means in said chamber including a valve head and valve stem mounted in said housing for reciprocating the valve head in said chamber to obstruct selectively free flow of liquid through said inner and outer ports;

resilient means urging said valve means to open said inner port in the direction counter to the pressurized inflow;

liquid level responsive means including a float pivotally mounted upon said housing and a cam follower on said valve stem coacting with the cam means when the fill level limit of the tank is approached;

said cam means having a cam surface engaged by said follower to hold said valve means in a full flow open position with respect to said inner port during filling operation, said follower moving from said cam surface into the cam relief recess when the fill limit of the tank is reached to permit flow through said inner valve port to be obstructed by said valve head in the direction of flow under inflowing filling pressures;

bleed means for equalizing pressures on opposite sides of said inner valve when closed against its port; and said resilient means urging said inner valve to open and retract said follower upon equalization of pressures on opposite sides of said inner valve port.

2. The filler valve unit defined in claim 1 in which:

said cam means is engaged by said follower only during the time and backflow check valve is open to hold the inner valve seat open while the fill level is below said fill limit.

3. The filler valve unit defined in claim 1 in which said cam means includes a rotary cam differential which has a substantially radial orientation following a sharp corner graduated enough for inertially retarding vertical load of movement the float means when closing the inlet port to permit closure of the inflow check valve without a hammering.

4. The combination defined in claim 1 in which said inner check valve is a normally closed outflow check valve supplementing said backflow check valve when the latter is closed, and opens under incoming pressure when said latter opens for filling purposes.

5. In a liquefied gas dispensing system:
 a customer storage tank having a horizontal opening in the wall thereof at a predetermined fill limit level;
 a filler valve unit received in said opening defining in tandem a connection for a filler hose for supplying LP Gas in its liquid phase under pressure above the vapor pressure in the tank and including
  a. a normally closed outer backflow check valve disposed downstream of a valve port and normally closing against said port and opening under incoming liquid phase pressure;
  b. an inner check valve means reciprocable in a chamber between spaced opposing inlet and outlet ports and defining full flow passage intermediate the opposing ports, said outlet port being in communication with the interior of the tank, means for urging the check valve means to close said inlet port but responsive to pressure in said inlet port for movement to close said outlet port;
  c. float means responsive to the level of liquid in the tank for releasably holding said inner check valve means at said intermediate position of its movement for full flow through said opposing ports; and
 float controlled means for releasing said inner check valve means to close when said predetermined fill level is reached.

6. The combination defined in claim 5 in which said float controlled means releases said inner check valve means to close its said inlet port.

7. The combination defined in claim 5 including pressure equalizing means interconnecting the tank and said chamber.

8. A filler valve unit comprising a valve housing extending through the wall of a storage tank and pivotally supporting a cam means at the liquid fill limit of the tank comprising:
 check valve means having spaced inflow and outflow check valve ports defining a valve compartment betweem them through which replenishing liquid can flow and a valve member for alternately closing said inner and outer ports;
 resilient means for urging said valve member to close said inflow check valve port;
 liquid level responsive means including a float pivotally mounted upon said housing and a cam follower journaled on said valve stem coacting therewith at the fill level limit of the tank;
 said cam means having a cam surface engaging said cam follower to hold said valve member in open position with respect to said inflow and outflow check valve ports for full flow between them and to move across the edge thereof into a recess when the fill limit of the tank is reached;
 said cam wall being inclined to the line of movement of said follower to permit said valve member to close against said outflow port under inflowing filling pressures;
 means for equalizing pressures on opposite sides of said outflow check valve port; and
 spring means urging said outflow check valve to open upon equalization of pressures on opposite sides of said inner valve.

9. A fill limiting filler valve assembly for a liquefied petroleum gas service tank comprising:
 a filler valve housing extendable through the wall of a storage tank and pivotally supporting a cam means at the liquid fill limit of the tank and including a normally closed filler valve for connection to a pressure filler hose in sealed relation and having a resiliently closed back flow check valve member opening an inlet port under inflowing liquid filling pressure;
 fill control means having an inner valve port with a valve chamber through which the replenishing liquid flows;
 valve means in said chamber mounted inside the wall of said housing including a valve head and a valve stem for driving the valve head in said chamber to obstruct flow of liquid through said inner port;
 resilient means urging said valve means to open said inner port against pressurized liquid inflow;
 liquid level responsive means including a float pivotally mounted upon said housing and a cam follower on said valve stem coacting with the cam means when the fill level limit of the tank is approached;
 said cam means having a cam surface engaged by said follower to hold said valve means in a full flow open position with respect to said inner port during filling operation, said follower moving from said cam surface into a cam relief recess to raise the float above its valve release position when the fill limit of the tank is reached to permit flow through said inner valve port to be obstructed by said valve head in the direction of flow under inflowing filling pressures;
 bleed means for equalizing pressures on opposite sides of said inner valve when closed against its port; and
 said resilient means urging said inner valve to open and retract said follower upon equalization of pressures on opposite sides of said inner valve port.

* * * * *